United States Patent
Teng et al.

(10) Patent No.: US 12,517,738 B2
(45) Date of Patent: Jan. 6, 2026

(54) LOOP DETECTION METHOD AND APPARATUS, ELECTRONIC DEVICE, AND STORAGE MEDIUM

(71) Applicant: BEIJING OCEANBASE TECHNOLOGY CO., LTD., Beijing (CN)

(72) Inventors: Xuwang Teng, Hangzhou (CN); Chen Qian, Hangzhou (CN); Zhenkun Yang, Hangzhou (CN); Fusheng Han, Hangzhou (CN); Fanyu Kong, Hangzhou (CN); Jinliang Xiao, Hangzhou (CN)

(73) Assignee: Beijing Oceanbase Technology Co., Ltd., Beijing (CN)

( * ) Notice: Subject to any disclaimer, the term of this patent is extended or adjusted under 35 U.S.C. 154(b) by 69 days.

(21) Appl. No.: 18/568,040

(22) PCT Filed: May 19, 2022

(86) PCT No.: PCT/CN2022/093777
§ 371 (c)(1),
(2) Date: Dec. 7, 2023

(87) PCT Pub. No.: WO2022/262515
PCT Pub. Date: Dec. 22, 2022

(65) Prior Publication Data
US 2024/0370269 A1    Nov. 7, 2024

(30) Foreign Application Priority Data
Jun. 15, 2021 (CN) .......................... 202110662248.4

(51) Int. Cl.
*G06F 16/00* (2019.01)
*G06F 9/445* (2018.01)
(Continued)

(52) U.S. Cl.
CPC .......... *G06F 9/44589* (2013.01); *G06F 9/524* (2013.01); *G06F 16/2308* (2019.01)

(58) Field of Classification Search
None
See application file for complete search history.

(56) References Cited

U.S. PATENT DOCUMENTS 11,301,517 B2 *  4/2022 Liu ....................... G06F 9/3838
2010/0223235 A1   9/2010 Fachan et al.
(Continued)

FOREIGN PATENT DOCUMENTS

| CN | 110442459 A | 11/2019 |
| CN | 111722933 A | 9/2020 |

(Continued)

OTHER PUBLICATIONS

E. Mannie, Ed. Generalized Multi-Protocol Label Switching (GMPLS) Architecture. Oct. 2024. RFC.*

(Continued)

*Primary Examiner* — Tuankhanh D Phan
(74) *Attorney, Agent, or Firm* — Womble Bond Dickinson (US) LLP

(57) ABSTRACT

This application provides a method including updating a candidate state of the node based on a candidate state of an adjacent downstream node; updating a public identifier of the target node to a public identifier of the adjacent downstream node in response to that the candidate state of the adjacent downstream node is the first candidate state and the public identifier of the target node is less than the public identifier of the adjacent downstream node; and in response to that the candidate state of the adjacent downstream node is the first candidate state and a private identifier of the target node is equal to the public identifier of the adjacent down- (Continued)

stream node, determining that a loop exists in a dependency path corresponding to the target node.

13 Claims, 11 Drawing Sheets

(51) Int. Cl.
    *G06F 9/52*         (2006.01)
    *G06F 16/23*       (2019.01)

(56) References Cited

U.S. PATENT DOCUMENTS

2020/0195439 A1*  6/2020  Suresh .................... H04L 45/72
2020/0301756 A1   9/2020  Aronovich

FOREIGN PATENT DOCUMENTS

| CN | 112994990 A | 6/2021 |
| CN | 113111099 A | 7/2021 |

OTHER PUBLICATIONS

The International Search Report and Written Opinion of the International Searching Authority for International Application No. PCT/CN2022/093777 mailed on Aug. 16, 2022.
Qiao, Yuran et al "Deadlock Detection and Recovery Based on Topological Order for NoC", Journal of Shanghai Jiaotong University, No. 01, Jan. 28, 2013 (Jan. 28, 2013), pp. 96-101.

* cited by examiner

S402

A target node further sends a loop detection message to a downstream node of the target node when it is determined that a loop exists in a data dependency path including the target node

S404

In response to receiving the loop detection message sent by an upstream node of the target node, determine that a loop exists in the data dependency path including the target node

FIG. 4

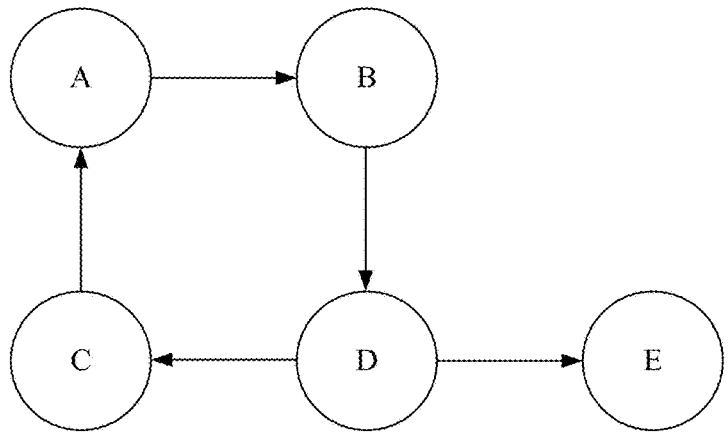

FIG. 5

Before a dependency
relationship is established
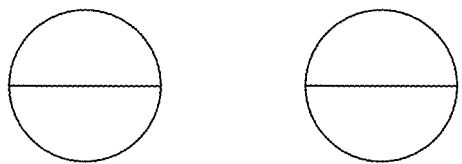
After the dependency
relationship is established
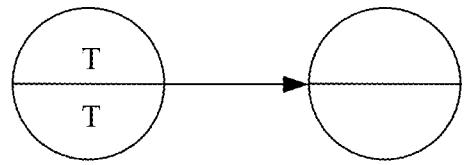
FIG. 6a
Before a dependency
relationship is removed
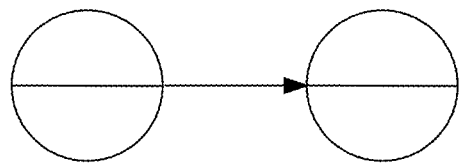
 
After the dependency
relationship is removed
After the dependency
relationship is removed
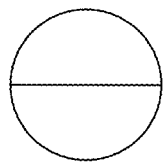 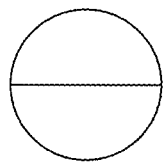  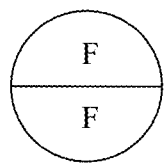 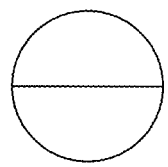
Out-degree>0                      Out-degree=0
FIG. 6b Before identifier transfer
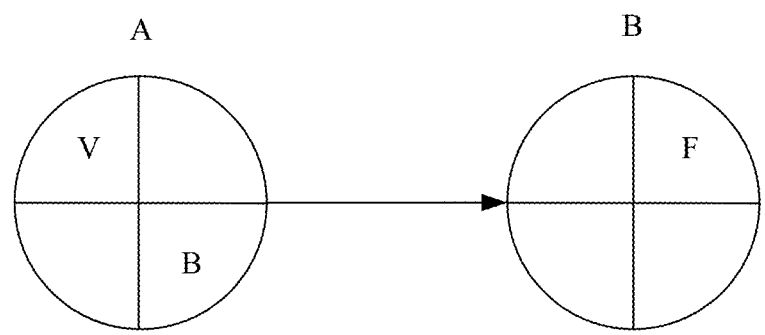
After identifier transfer
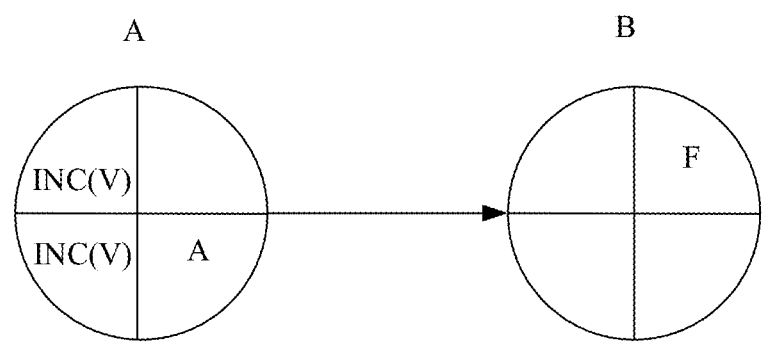
FIG. 7c

LOOP DETECTION METHOD AND APPARATUS, ELECTRONIC DEVICE, AND STORAGE MEDIUM

CROSS-RELATED APPLICATIONS

This specification is a U.S. National Stage Application of PCT Application Serial PCT/CN2022/093777, filed on May 19, 2022, which claims priority to Chinese Patent Application No. 202110662248.4, filed with the China National Intellectual Property Administration on Jun. 15, 2021, which is incorporated herein by reference in its entirety.

TECHNICAL FIELD

One or more embodiments of this application relate to the network service risk identification field, and in particular, to a loop detection method and apparatus, an electronic device, and a storage medium.

BACKGROUND

In a distributed system, a data dependency relationship may exist between nodes that execute concurrent transactions. If several nodes that have a data dependency relationship form a loop, performance of the distributed system may be affected.

For example, when the distributed system is a distributed database system, if a node A and a node B in the system form a loop, the node A needs to depend on a result of executing a transaction by the node B, and the node B also needs to depend on a result of executing a transaction by the node B. Consequently, a deadlock occurs between the node A and the node B, and it is difficult to normally execute a transaction. Therefore, loop detection is required.

Currently, in some related technologies, a global dependency path needs to be maintained on a node, and then loop detection is performed by using the node. In this case, an operation excessively depends on a single node. If the node is killed, loop detection cannot be performed normally. In addition, the global dependency path needs to be transferred between nodes. Consequently, the node maintains and transfers a large amount of information, and performance of executing a distributed transaction by the node may deteriorate. However, in some other loop detection methods, loop detection can be performed only in a single out-degree scenario. Therefore, the loop detection methods cannot be applied to a multi-out-degree scenario. "Single out-degree" means that a node may depend on only a single node, or a single node depends on a node. "Multi-out-degree" means that a node may depend on a plurality of nodes, or a plurality of nodes may depend on a node.

SUMMARY

In view of this, this application provides a loop detection method. The method can be applied to any target node in a distributed system. The target node corresponds to at least one dependency path whose start point is the target node, there is a data dependency relationship between any two adjacent nodes in the dependency path, the target node maintains a candidate state, a public identifier, and a private identifier that correspond to the target node, the public identifier is used to be transferred between adjacent nodes, and the private identifier is used to indicate a node corresponding to the private identifier. The method can include: obtaining a candidate state of an adjacent downstream node, and updating the candidate state of the target node based on the candidate state of the adjacent downstream node, so that an upstream node of the target node updates a candidate state of the upstream node based on an updated candidate state of the target node, a candidate state of an endpoint in each dependency path is transferred forwarded, and if the endpoint has a downstream node, the candidate state of the endpoint is a first candidate state; obtaining the candidate state and a public identifier of the adjacent downstream node, and updating the public identifier of the target node to the public identifier of the adjacent downstream node in response to that the candidate state of the adjacent downstream node is the first candidate state and the public identifier of the target node is less than the public identifier of the adjacent downstream node; and in response to that the candidate state of the adjacent downstream node is the first candidate state and the private identifier of the target node is equal to the public identifier of the adjacent downstream node, determining that a loop exists in the dependency path corresponding to the target node.

In some shown embodiments, the target node further maintains a notification state, and the notification state includes a first notification state indicating to notify the downstream node of the node to update the candidate state and a second notification state indicating not to notify the downstream node of the node to update the candidate state; and the updating the candidate state of the target node based on the candidate state of the adjacent downstream node includes: updating the candidate state of the target node based on the candidate state of the adjacent downstream node in response to that the notification state of the target node is the second notification state; and sending a notification message to the adjacent downstream node in response to that the notification state of the target node is the first notification state, so that the adjacent downstream node updates the candidate state to a second candidate state in response to that the adjacent downstream node is an end node, or updates the candidate state to the first candidate state in response to that the adjacent downstream node is not an end node; and updating the candidate state of the target node based on the candidate state of the adjacent downstream node, and updating the notification state of the target node to the second notification state.

In some shown embodiments, the method further includes: in response to that a dependency relationship is established, updating the notification state of the target node to the first notification state, and updating the candidate state of the target node to the first candidate state; and in response to that the dependency relationship is removed and the target node is the end node, updating the candidate state of the target node to the second candidate state, and updating the notification state of the target node to the second notification state.

In some shown embodiments, the target node further maintains identifier source information, and the identifier source information indicates a source of the public identifier of the target node; and the method further includes: updating the identifier source information of the target node after the public identifier of the target node is updated to the public identifier of the adjacent downstream node, so that the identifier source information indicates that the public identifier of the target node comes from the adjacent downstream node.

In some shown embodiments, after the obtaining the candidate state and a public identifier of the adjacent downstream node, the method further includes: in response to that the candidate state of the adjacent downstream node is a second candidate state and the identifier source information of the target node indicates that the public identifier of the target node comes from the adjacent downstream node, increasing the public identifier of the target node, and updating the private identifier of the target node to the increased public identifier, so that the public identifier and the private identifier of the target node are greater than the public identifier of the adjacent downstream node.

In some shown embodiments, the increasing the public identifier of the target node includes: inputting the public identifier of the target node into an increasing function, to obtain the increased public identifier, where the increasing function is used to make an output greater than an input.

In some shown embodiments, the method further includes: in response to that a dependency relationship is established or removed, increasing the public identifier of the target node, and updating the private identifier of the target node to the increased public identifier.

In some shown embodiments, the method further includes: further sending, by the target node, a loop detection message to the downstream node of the target node when determining that a loop exists in the dependency path corresponding to the target node; and in response to receiving the loop detection message sent by the upstream node of the target node, determining that a loop exists in the dependency path including the target node.

In some shown embodiments, the private identifier is a globally unique node identifier indicating a priority of the node; the loop detection message includes the private identifier of the target node, and when receiving the loop detection message, after determining that the public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the dependency path downstream; and the method further includes: in response to receiving the loop detection message sent by the upstream node of the target node, obtaining the private identifier that is of each node and that is carried in the loop detection message, and determining that a node that has the highest or lowest priority and that is indicated by the private identifier of each node is a loop processing node; and triggering the loop processing node to be disabled, to remove the loop.

In some shown embodiments, the method further includes: in response to determining that a loop exists in the dependency path including the target node, triggering the target node to be disabled, to remove the loop.

In some shown embodiments, the distributed system includes a distributed database system, the node includes a transaction process configured to execute a database transaction, and the dependency path includes a path in a WPG wait-for graph constructed based on a lock waiting relationship between transaction processes in the distributed database system.

This application further provides a loop detection apparatus, applied to any target node in a distributed system. The target node corresponds to at least one dependency path whose start point is the target node, there is a data dependency relationship between any two adjacent nodes in the dependency path, the target node maintains a candidate state, a public identifier, and a private identifier that correspond to the target node, the public identifier is used to be transferred between adjacent nodes, and the private identifier is used to indicate a node corresponding to the private identifier. The apparatus includes: a state transfer module, configured to: obtain a candidate state of an adjacent downstream node, and update the candidate state of the target node based on the candidate state of the adjacent downstream node, so that an upstream node of the target node updates a candidate state of the upstream node based on an updated candidate state of the target node, a candidate state of an endpoint in each dependency path is transferred forwarded, and if the endpoint has a downstream node, the candidate state of the endpoint is a first candidate state; an identifier transfer module, configured to: obtain the candidate state and a public identifier of the adjacent downstream node, and update the public identifier of the target node to the public identifier of the adjacent downstream node in response to that the candidate state of the adjacent downstream node is the first candidate state and the public identifier of the target node is less than the public identifier of the adjacent downstream node; and a loop determining module, configured to: in response to that the candidate state of the adjacent downstream node is the first candidate state and the private identifier of the target node is equal to the public identifier of the adjacent downstream node, determining that a loop exists in the dependency path corresponding to the target node.

This application further provides an electronic device, including a processor and a memory configured to store processor-executable instructions. The processor runs the executable instructions, to implement the loop detection method shown in any one of the above-mentioned embodiments.

This application further provides a computer-readable storage medium. The storage medium stores a computer program, and the computer program is used to enable a processor to perform the loop detection method shown in any one of the above-mentioned embodiments.

In the solution recorded in this application, first, any target node in the distributed system performs a step of updating a candidate state of the target node to a candidate state of an adjacent downstream node of the target node, so that a candidate state of an endpoint in each dependency path can be transferred to each node in the dependency path. In this solution, when the endpoint in the dependency path has a downstream node, the candidate state of the endpoint can be set to the first candidate state. In this way, candidate states of all nodes in the dependency path are all the first candidate state after being transferred. Because a dependency path whose endpoint has a downstream node is a loop, any target node in the distributed system performs the step of updating the candidate state of the target node to the candidate state of the adjacent downstream node of the target node, so that when a candidate state maintained by each node is the first candidate state, it can accurately indicate that a loop exists in a dependency path corresponding to the node.

Second, a public identifier of the target node is updated to a public identifier of the adjacent downstream node in response to that the candidate state of the adjacent downstream node is the first candidate state and the public identifier of the target node is less than the public identifier of the adjacent downstream node. In this way, a larger public identifier can be transferred in the path. In this solution, in response to that the candidate state of the adjacent downstream node is the first candidate state and a private identifier of the target node is equal to the public identifier of the adjacent downstream node, it is determined that a loop exists in the dependency path corresponding to the target node. Therefore, it can be ensured that the loop is always detected by a node with a largest public identifier in the loop. In this way, loop detection does not depend on a single node, to avoid a case in which loop detection cannot be continued after the node is killed. In addition, only one node in one loop is killed because there is only one largest node in one loop. In the solution recorded in this application, a case in which too many nodes are killed does occur.

Third, each node only needs to perform message transfer between the node and an adjacent node of the node in a candidate state and public identifier transfer process. Therefore, each node only needs to maintain a dependency relationship between the node and a node directly adjacent to the node, to prevent the node from maintaining a global dependency path, thereby reducing a workload of the node and improving performance of executing a transaction by the node. In addition, loop detection can still be implemented in a semi-asynchronous network with strict operation.

Fourth, the public identifier of the target node is updated to the public identifier of the adjacent downstream node in response to that the candidate state of the adjacent downstream node is the first candidate state and the public identifier of the target node is less than the public identifier of the adjacent downstream node. Therefore, a public identifier of a downstream node is transferred only when a candidate state of the downstream node is the first candidate state. In this way, a public identifier of a node in the first candidate state can be transferred, and a public identifier of a node in a non-first candidate state cannot be transferred, thereby avoiding a case in which transferring the public identifier in the loop is affected and loop detection is affected when a public identifier of a node in the non-first candidate state and that is at a downstream location in the loop is transferred to the loop, so as to implement multi-out-degree loop detection.

BRIEF DESCRIPTION OF DRAWINGS

FIG. 4 is a schematic flowchart illustrating a loop detection method, according to this application;

FIG. 5 is a schematic diagram illustrating a dependency path, according to this application;

FIG. 6a is a schematic diagram illustrating maintenance and transfer of a candidate state of a node, according to this application;

FIG. 6b is a schematic diagram illustrating maintenance and transfer of a candidate state of a node, according to this application;

FIG. 7c is a schematic diagram illustrating maintenance and transfer of a public identifier of a node, according to this application;

DESCRIPTION OF EMBODIMENTS

Example embodiments are described in detail here, and examples of the example embodiments are presented in the accompanying drawings. When the following description relates to the accompanying drawings, unless specified otherwise, the same numbers in different accompanying drawings represent the same or similar elements. The embodiments described in the following example embodiments do not represent all embodiments consistent with one or more embodiments of this application. On the contrary, the embodiments are merely examples of apparatuses and methods that are described in the appended claims in detail and consistent with some aspects of one or more embodiments of this specification.

In another embodiment, steps of a corresponding method are not necessarily performed in a sequence shown and described in this application. In some other embodiments, the method can include more or fewer steps than that described in this application. In addition, a single step described in this application may be split into a plurality of steps in other embodiments for description; and a plurality of steps described in this application may be combined into a single step in other embodiments for description.

In this application, that a distributed system is a distributed database system is used as an example to describe loop detection. For another type of distributed system, references can be made to the distributed database system.

Figure 1:
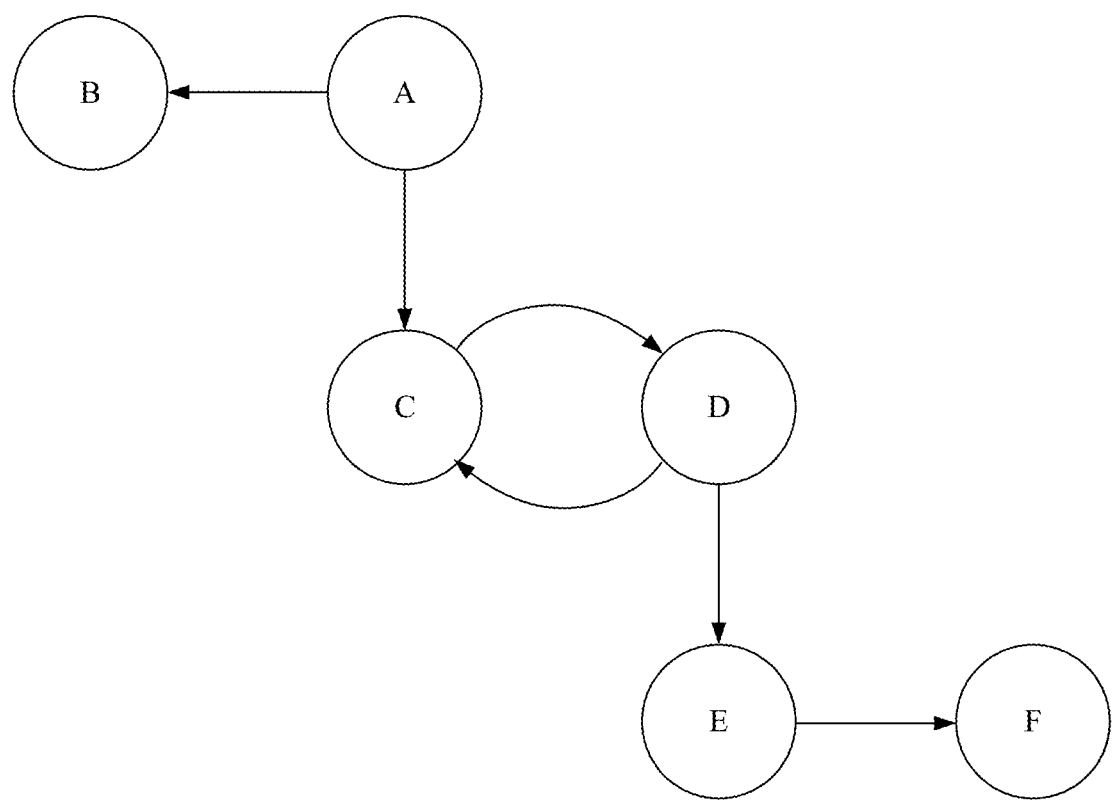
FIG. 1 is a schematic diagram illustrating a dependency path, according to this application.

FIG. 1 is a schematic diagram illustrating a dependency path, according to this application.

The following describes some concepts with reference to FIG. 1.

A node is a process of executing a distributed database transaction. Nodes such as nodes A to F shown in FIG. 1 can be from the same physical device or different physical devices.

Dependency relationship: If a node A needs to execute a transaction based on a result of executing a transaction by a node B, it can be considered that the node A depends on the node B, and the node A and the node B have a dependency relationship. The dependency relationship has a direction, and that A depends on B can be represented as A→B.

An upstream node is a node that needs to depend on another node in a dependency relationship. A downstream node is a node on which another node depends in a dependency relationship. In a dependency relationship between a node A and a node B shown in FIG. 1, the node A is an upstream node, and the node B is a downstream node.

End node: A node without a downstream node is referred to as an end node, for example, a node B and a node F in FIG. 1.

A dependency path is a path whose start point is a node and that is formed between the node and an end node or a node existing in a path based on an out-degree dependency relationship of the start point. There is a dependency relationship between two adjacent nodes in the dependency path. The dependency path has a direction.

A node A shown in FIG. 1 is used as an example. The node A corresponds to three dependency paths. The three dependency paths are respectively A→B, A→C→D→C, and A→C→D→E→F. A start point of the first dependency path is the node A, and an endpoint is the end node B. A start point of the second dependency path is the node A, and an endpoint is the node C that has been in the path. A start point of the third dependency path is the node A, and an endpoint is the end node F. The node E is used as an example. The node E corresponds to one dependency path: E→F.

The dependency path can be divided into a loop and a non-loop. The non-loop is a path whose endpoint is an end node, for example, dependency paths A→B and A→C→D→E→F in FIG. 1.

The loop is a path whose endpoint is a node that has been in a path. Two nodes that depend on each other exist in the loop, for example, the loop A→C→D→C shown in FIG. 1. The node C depends on the node D, and the node D also depends on the node C. In other words, the node C and the node D depend on each other, and a loop exists.

An in-loop node is a node in a loop, for example, nodes C and D in FIG. 1.

An out-of-loop node is a point outside a loop, for example, nodes A, B, E, and F in FIG. 1. The nodes E and F are out-of-loop nodes located downstream in the loop.

Candidate state maintained by a node: It should be noted that the candidate state includes a candidate state in a transfer process and a stable candidate state after a plurality of candidate state transfer times. A candidate state of each node in the transfer process can frequently change, and therefore, is not stable.

A stable candidate state can be a candidate state that is obtained after a plurality of candidate state transfer times and that does not change. The stable candidate state is used to indicate whether a loop exists in at least one dependency path corresponding to a corresponding node. The stable candidate state can include a first candidate state indicating that a loop exists in the at least one dependency path corresponding to the node, and a second candidate state indicating that a loop does not exist in the at least one dependency path corresponding to the node. In some embodiments, the first candidate state can be indicated by using a string TRUE, and the second candidate state can be indicated by using a string FALSE.

When a candidate state of any node is the first candidate state, it can indicate that a loop exists in a dependency path whose start point is the node, for example, A→C→D→C in FIG. 1. A stable candidate state of the node A is the first candidate state. For a node E, a dependency path E→F corresponding to the node E is a non-loop, and stable candidate states of the nodes E and F are the second candidate state. It should be noted here that, in this application, if a dependency path corresponding to any node includes both a loop and a non-loop, a candidate state of the node is the first candidate state. For example, a dependency path corresponding to the node A in FIG. 1 includes a non-loop A→B and a loop A→C→D→C, and a stable candidate state of the node A is the first candidate state.

A private identifier maintained by a node can be used to uniquely identify a node corresponding to the private identifier.

A public identifier maintained by a node can be used to be transferred between adjacent nodes. An initial value of the public identifier is the same as an initial value of the private identifier.

Message transfer is data transfer between an upstream node and a downstream node that have a dependency relationship. The upstream node can maintain information (for example, an IP address) about a downstream node adjacent to the upstream node, and a message can be sent to the downstream node adjacent to the upstream node based on the information. The downstream node can also return a message to the upstream node. The message transferred in this application can include a candidate state, a private identifier, a public identifier, a loop detection message, etc.

In view of this, this application provides a loop detection method. In the method, any node in a system updates a candidate state of the any node based on a candidate state of an adjacent downstream node of the any node, to implement maintenance and transfer of the candidate state, so that that the candidate state of the any node is a first candidate state can indicate that a loop exists in a dependency path corresponding to the node. In the method, the any node in the system can maintain information about a node that has a dependency relationship with the any node, and exchange information with an adjacent node that has a dependency relationship, so that a public identifier of a node in the first candidate state can be transferred in the dependency path, thereby avoiding a case in which a public identifier of an out-of-loop node in a non-first candidate state is transferred to the loop and loop detection is affected. In the method, in response to that a private identifier of the any node is equal to a public identifier transferred by an upstream node of the any node, it can be determined that a public identifier of the any node is transferred for one round, to find a loop.

Figure 2:
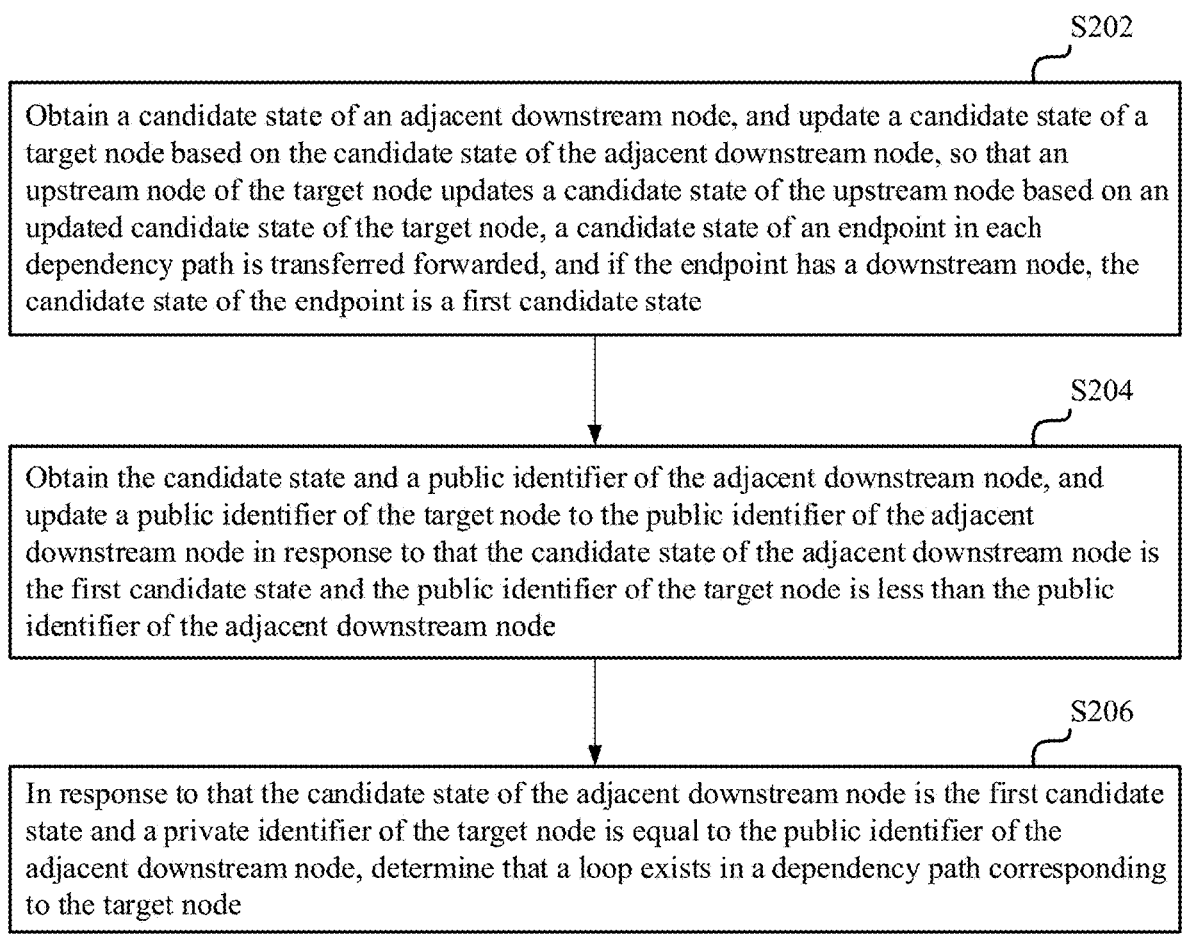
FIG. 2 is a method flowchart illustrating a loop detection method, according to this application.

FIG. 2 is a method flowchart illustrating a loop detection method, according to this application.

As shown in FIG. 2, the method can include: S202: Obtain a candidate state of an adjacent downstream node, and update a candidate state of a target node based on the candidate state of the adjacent downstream node, so that an upstream node of the target node updates a candidate state of the upstream node based on an updated candidate state of the target node, a candidate state of an endpoint in each dependency path is transferred forwarded, and if the endpoint has a downstream node, the candidate state of the endpoint is a first candidate state.

S204: Obtain the candidate state and a public identifier of the adjacent downstream node, and update a public identifier of the target node to the public identifier of the adjacent downstream node in response to that the candidate state of the adjacent downstream node is the first candidate state and the public identifier of the target node is less than the public identifier of the adjacent downstream node.

S206: In response to that the candidate state of the adjacent downstream node is the first candidate state and a private identifier of the target node is equal to the public identifier of the adjacent downstream node, determine that a loop exists in the dependency path corresponding to the target node.

The method can be applied to any target node in a distributed system (referred to as a system below). In other words, the method is performed by any target node in the distributed system. The system can include a plurality of electronic devices with the same address or different addresses. The electronic devices can cooperate to execute a distributed transaction. A specific type of the electronic device and a specific architecture of the system are not limited in this application. The following provides descriptions by using any target node in the distributed system (referred to as a system below) as an example.

The target node corresponds to at least one dependency path whose start point is the target node, there is a data dependency relationship between any two adjacent nodes in the dependency path, the target node maintains the candidate state, the public identifier, and the private identifier that correspond to the target node, the candidate state includes a first candidate state indicating that a loop exists in at least one dependency path corresponding to the node, the public identifier is used to be transferred between adjacent nodes, and the private identifier is used to indicate a node corresponding to the private identifier.

In some embodiments, when S202 is performed, the target node can send a candidate state obtaining request to the adjacent downstream node of the target node through message transfer. After receiving the request, the downstream node can send the candidate state of the downstream node to the target node. After obtaining the candidate state of the adjacent downstream node, the target node can update the candidate state of the target node based on the candidate state of the adjacent downstream node.

In some embodiments, when the candidate state of the target node is updated, the candidate state of the target node can be updated based on the following rule: If a candidate state of at least one downstream node of the target node is the first candidate state, the candidate state of the target node is updated to the first candidate state; or if candidate states of all downstream nodes on which the target node depends are non-first candidate states, a subsequent state of the target node is updated to a non-first candidate state.

FIG. 1 is used as an example. A node D can obtain a candidate state of an adjacent node E and a candidate state of an adjacent node C. Assuming that a candidate state of the node E is the non-first candidate state and the candidate state of the node C is the first candidate state, a candidate state of the node D is updated to the first candidate state. Assuming that the candidate state of the node C is also the non-first candidate state, the candidate state of the node D is updated to the non-first candidate state.

By analogy, candidate state transfer is also performed between the upstream node of the target node and the target node. In other words, a candidate state of a downstream node in the path is transferred upward.

When the step shown in S202 is periodically performed between any two nodes that have a dependency relationship in the system, it can be understood that each node transfers the candidate state of the endpoint.

In this application, there can be some candidate state maintenance mechanisms, so that when the endpoint in the dependency path has a downstream node, it can be ensured that the candidate state of the endpoint is the first candidate state. For example, the maintenance mechanism can include: A node periodically detects whether there is a downstream node, and sets a candidate state of the node to the first candidate state if there is a downstream node. In this way, when an endpoint in each dependency path has a downstream node, it can be ensured that a candidate state of the endpoint is the first candidate state.

Therefore, when an endpoint in a dependency path is a node that has been in the path, because the endpoint has a downstream node, a candidate state of the node is the first candidate state. In other words, step S202 is periodically performed, and finally, a candidate state of each node in the path can be the first candidate state.

If an endpoint in a dependency path is a node that has been in the path, it can indicate that a loop exists in the path. It can be learned that, step S202 is performed for a plurality of times, so that a candidate state of each node in the dependency path can accord with an actual situation. In other words, if a candidate state of a node is the first candidate state, a loop exists in a dependency path whose start point is the node.

FIG. 1 is used as an example. In FIG. 1, for the node A, an endpoint in a loop A→C→D→C of the node A is the node C. Because the node C has the downstream node D, the candidate state of the node C is the first candidate state. After S202 is performed for a plurality of times, candidate states corresponding to the nodes A, B, and C are all the first candidate state. That is, a candidate state of each node accord with an actual situation.

For a path A→C→D→E→F, the node E depends on the node F. Because the end node F has no downstream node, after S202 is performed for a plurality of times, candidate states of the node E and the node F are the non-first candidate state. The node D depends on both the node E and the node C. Because the candidate state of the node C is the first candidate state, when the candidate state of the node D is updated, the candidate state of the node D can be updated to the first candidate state based on an updating rule.

The target node can further perform S204 and S206. In some embodiments, in a candidate state transfer process, the target node can further send a candidate state and public identifier obtaining request to the adjacent downstream node of the target node through message transfer. The downstream node can send the candidate state and the public identifier of the downstream node to the target node in response to the request.

The target node can determine, based on the received candidate state, whether the candidate state of the adjacent downstream node of the target node is the first candidate state. If the candidate state of the downstream node is the first candidate state, it can indicate that a loop exists in a path whose start point is the downstream node. In other words, it is necessary to determine whether a loop exists in the path corresponding to the downstream node. Therefore, the public identifier of the downstream node and the public identifier of the target node can be compared, and the public identifier of the target node is updated to the public identifier of the adjacent downstream node if the public identifier of the target node is less than the public identifier of the adjacent downstream node.

In a public identifier transfer process, if the target node finds that the private identifier of the target node is equal to the obtained public identifier of the adjacent downstream node, it can be determined that the public identifier (an initial value is equal to the private identifier of the target node) of the target node is transferred for one round. In other words, a loop exists in the dependency path corresponding to the target node.

FIG. 1 is used as an example. After S202 is performed for a plurality of times, candidate states of the nodes A, C, and D are the first candidate state. The candidate states of the nodes E and F are the non-first candidate state. A public identifier of the node D is greater than a public identifier of the node C. An initial value of the public identifier of the node D is equal to a private identifier of the node D. When S204 is performed, after the node C obtains the public identifier of the node D, because the node D is in the first candidate state and the public identifier of the node C is less than the public identifier of the node D, the public identifier of the node C is updated to the public identifier of the node D. Then, after obtaining the public identifier of the node C, the node D can find that the private identifier of the node D is the same as the public identifier of the node C, and can determine that a loop exists in a path corresponding to the node D.

This solution can be further applied to a multi-out-degree scenario. FIG. 1 is used as an example. In the multi-out-degree scenario, because of complexity of a dependency relationship of each node, an initial public identifier of the node E may be greater than the public identifier of the node D. If the public identifier of the node E is transferred to a loop C→D, neither the node C nor the node D finds that the private identifier of the node C or the node D is the same as the public identifier of the node E, that is, neither the node C nor the node D finds a loop. Consequently, loop detection fails.

In this solution, when S204 is performed, after the node D obtains the candidate state and the public identifier of the node E, because the candidate state of the node E after S202 is performed for a plurality of times is the non-first candidate state, that is, regardless of a value of the public identifier of the node E, the public identifier of the node E is not transferred to the loop C→D. In other words, public identifier transfer between the node C and the node D is not affected. That is, in the solution recorded in this application, loop detection can also be performed in the multi-out-degree scenario.

In the solution recorded in this application, first, any target node in the distributed system performs a step of updating a candidate state of the target node to a candidate state of an adjacent downstream node of the target node, so that a candidate state of an endpoint in each dependency path can be transferred to each node in the dependency path. In this solution, when the endpoint in the dependency path has a downstream node, the candidate state of the endpoint can be set to the first candidate state. In this way, candidate states of all nodes in the dependency path are all the first candidate state after being transferred. Because a dependency path whose endpoint has a downstream node is a loop, any target node in the distributed system performs the step of updating the candidate state of the target node to the candidate state of the adjacent downstream node of the target node, so that when a candidate state maintained by each node is the first candidate state, it can accurately indicate that a loop exists in a dependency path corresponding to the node.

Second, a public identifier of the target node is updated to a public identifier of the adjacent downstream node in response to that the candidate state of the adjacent downstream node is the first candidate state and the public identifier of the target node is less than the public identifier of the adjacent downstream node. In this way, a larger public identifier can be transferred in the path. In this solution, in response to that the candidate state of the adjacent downstream node is the first candidate state and a private identifier of the target node is equal to the public identifier of the adjacent downstream node, it is determined that a loop exists in the dependency path corresponding to the target node. Therefore, it can be ensured that the loop is always detected by a node with a largest public identifier in the loop. In this way, loop detection does not depend on a single node, to avoid a case in which loop detection cannot be continued after the node is killed. In addition, only one node in one loop is killed because there is only one largest node in one loop. In the solution recorded in this application, a case in which too many nodes are killed does occur.

Third, each node only needs to perform message transfer between the node and an adjacent node of the node in a candidate state and public identifier transfer process. Therefore, each node only needs to maintain a dependency relationship between the node and a node directly adjacent to the node, to prevent the node from maintaining a global dependency path, thereby reducing a workload of the node and improving performance of executing a transaction by the node. In addition, loop detection can still be implemented in a semi-asynchronous network with strict operation.

Fourth, the public identifier of the target node is updated to the public identifier of the adjacent downstream node in response to that the candidate state of the adjacent downstream node is the first candidate state and the public identifier of the target node is less than the public identifier of the adjacent downstream node. Therefore, a public identifier of a downstream node is transferred only when a candidate state of the downstream node is the first candidate state. In this way, a public identifier of a node in the first candidate state can be transferred, and a public identifier of a node in the non-first candidate state cannot be transferred, thereby avoiding a case in which transferring the public identifier in the loop is affected and loop detection is affected when a public identifier of a node in the non-first candidate state and that is at a downstream location in the loop is transferred to the loop, so as to implement multi-out-degree loop detection.

In some embodiments, when the target node finds a loop, the target node can be triggered to be disabled, to remove the loop, to ensure that a distributed transaction is successfully executed. In some embodiments, the loop can be removed in a manner such as rolling back a transaction or releasing a dependency relationship of the target node.

In some embodiments, the target node can further control updating of the candidate state of the downstream node by maintaining a notification state, so that the downstream node can obtain a stable candidate state.

The notification state can include a first notification state indicating to notify the downstream node of the node to update the candidate state and a second notification state indicating not to notify the downstream node of the node to update the candidate state.

In some embodiments, when the target node newly establishes a dependency relationship, an initial notification state of the target node can be updated to the first notification state, and an initial candidate state of the target node can be updated to the first candidate state. Therefore, the candidate state of the target node and the candidate state of the downstream node of the target node can be updated again after the dependency relationship is newly established.

Figure 3:
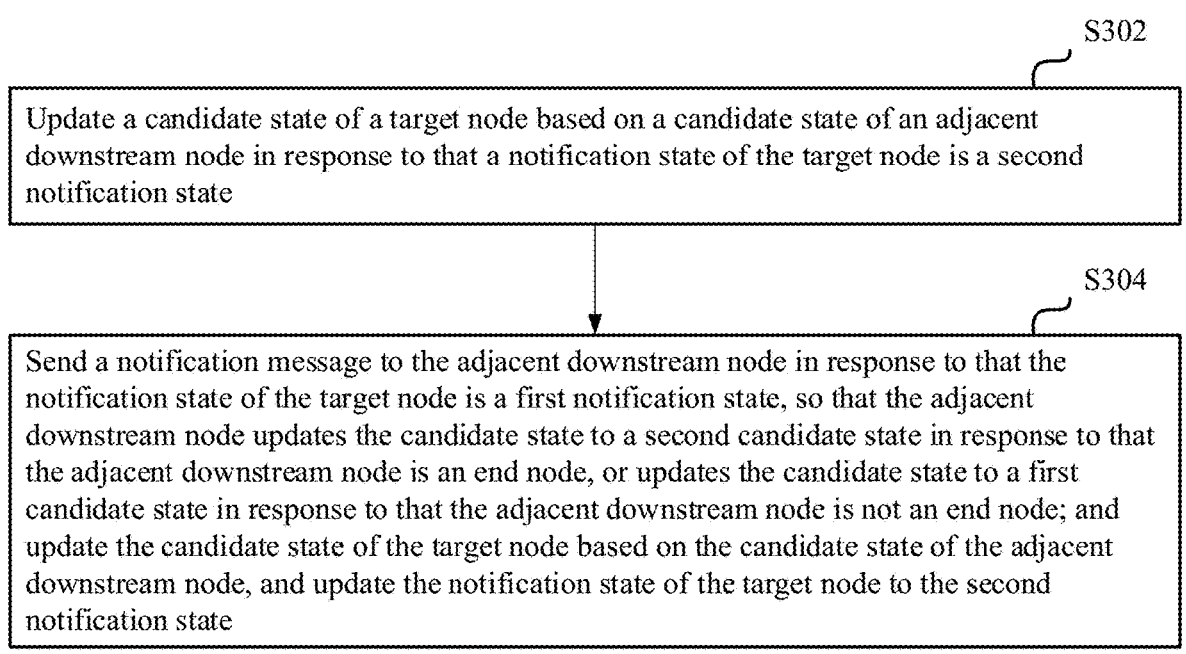
FIG. 3 is a flowchart illustrating a candidate state updating method, according to this application.

FIG. 3 is a flowchart illustrating a candidate state updating method, according to this application.

As shown in FIG. 3, when S202 is performed, after obtaining the candidate state of the adjacent downstream node of the target node, the target node can update the candidate state based on the notification state of the target node. S302: Update the candidate state of the target node based on the candidate state of the adjacent downstream node in response to that the notification state of the target node is the second notification state. S304: Send a notification message to the adjacent downstream node in response to that the notification state of the target node is the first notification state, so that the adjacent downstream node updates the candidate state to a second candidate state in response to that the adjacent downstream node is an end node, or updates the candidate state to the first candidate state in response to that the adjacent downstream node is not an end node; and update the candidate state of the target node to a current candidate state of the adjacent downstream node, and update the notification state of the target node to the second notification state.

FIG. 1 is used as an example. It is assumed that a dependency relationship between the node D and the node C is newly established. In other words, a notification state of the node D is the first notification state. After the node D newly establishes the dependency relationship, and obtains the candidate state of the node C and the candidate state of the node E for the first time, the node D can send a state updating notification to the node C and the node E in response to that the node D is in the first notification state, so that the node C and the node E can update the candidate state of the node C and the candidate state of the node E, to obtain an accurate candidate state. After a plurality of candidate state transfer times, a stable candidate state of the node E can be the same as that of the node F, that is, the second candidate state.

It is assumed that a dependency relationship between the node E and the node F is also newly established. Because the downstream node F has no downstream node (the downstream node F is an end node), a candidate state of the downstream node F is the second candidate state.

Because the node C and the node E each have a downstream node, the node C and the node E each can be updated to the first candidate state. Then, the node C and the node E can further send the updated candidate state to the node D. The node D can update the candidate state of the node D to the candidate state of the node C and the node E. After candidate state updating is completed, the node D can update a notification state of the node D to the second notification state. In this way, after the node D subsequently obtains the candidate state of the node C and the candidate state of the node E, the node D does not update states of the node C and the node E, the candidate state of the node C can be stably maintained as the first candidate state, and the candidate state of the node E can be stably maintained as the second candidate state.

In some embodiments, when removing the dependency relationship, the target node can further update the candidate state of the target node, so that the candidate state of the target node accords with an actual situation. When the dependency relationship is removed, if the target node is an end node (that is, the target node has no downstream node), the target node can update the candidate state of the target node to the second candidate state, and update the notification state of the target node to the second notification state. If the target node has a downstream node, the target node does not have to update the candidate state of the target node.

In some embodiments, the target node can maintain identifier source information, and the identifier source information indicates a source of the public identifier of the target node. An initial value of the identifier source information of the target node can be a node sequence number of the target node.

When S202 is performed, if the candidate state of the target node is updated to the candidate state of the adjacent downstream node of the target node, the identifier source information of the target node can be updated, so that the identifier source information indicates that the public identifier of the target node comes from the adjacent downstream node.

FIG. 1 is used as an example. It is assumed that the candidate state of the node E is the first candidate state at a moment before being stable, and a public state of the node E is greater than that of the node D. In this case, the node D can set the public identifier of the node E to the public identifier of the node D, and update identifier source information maintained by the node D to a sequence number of the node E, to indicate that a source of the public identifier of the node D is the node E.

In some embodiments, to adapt to a case in which the dependency relationship changes in real time, S202 and S204 can be steps separately and independently performed. In this case, public identifier transfer may be performed before a candidate state of a node in a dependency path becomes stable. Consequently, a public identifier of a downstream out-of-loop node is transferred to the loop, and loop detection is affected.

FIG. 1 is used as an example. It is assumed that the candidate state of the node E is the first candidate state at a moment before being stable, and a public state of the node E is greater than that of the node D. In this case, the public identifier of the node E can be transferred to the loop C→D, and loop detection is affected.

In some embodiments, after the target node obtains the candidate state of the adjacent downstream node of the target node, in response to that the candidate state of the adjacent downstream node is the second candidate state and the identifier source information of the target node indicates that the public identifier of the target node comes from the adjacent downstream node, the target node can increase the public identifier of the target node, and update the private identifier of the target node to the increased public identifier, so that the public identifier and the private identifier of the target node are greater than the public identifier of the adjacent downstream node.

FIG. 1 is used as an example. It is assumed that the public identifier of the node E is transferred to the node D. After a plurality of candidate state transfer times, the stable candidate state of the node E is the second candidate state. In this case, in response to that the node E is in the second candidate state and it is determined, based on the identifier source information, that the public identifier of the node E has been transferred to the node D, the node D can increase the public identifier based on a current public identifier, and update the private identifier of the node D to an increased public identifier, so that both the public identifier and the private identifier of the node D are greater than those of the node E, and a public identifier transferred in the loop is the public identifier of the node D rather than the public identifier of the node E. Therefore, even if the public identifier of the node E is transferred to the loop, the public identifier of the node E is not transferred in the loop, and loop detection is not affected.

In some embodiments, the target node can maintain an increasing function, to increase the public identifier. When increasing the public identifier, the target node can input the current public identifier into the increasing function, to obtain the increased public identifier. It should be noted that a specific type of the increasing function is not limited in this application. For example, the increasing function can be an Inc function.

In some embodiments, because an original dependency path has changed after any node establishes or removes a dependency relationship, for example, a new loop may be formed, or a loop disappears, public identifier transfer needs to be performed again. In some embodiments, in response to that the dependency relationship is established or removed, the public identifier of the target node can be increased, and the private identifier of the target node can be updated to an increased public identifier, to newly generate a public identifier and a private identifier for the target node, and overwrite a public identifier that starts to be transferred previously, so that a larger public identifier is transferred again in the loop, instead of the previous public identifier. In this way, the previous public identifier does not affect loop detection.

In some embodiments, when the target node finds a loop, the target node can send a loop detection message in the loop to perform second-time loop confirmation, thereby reducing an error detection rate of loop detection and improving loop detection correctness.

FIG. 4 is a schematic flowchart illustrating a loop detection method, according to this application.

As shown in FIG. 4, S402 can be performed. The target node further sends the loop detection message to the downstream node of the target node when it is determined that a loop exists in the dependency path including the target node. Then, S404 can be performed. In response to that the loop detection message sent by the upstream node of the target node is received, it is determined that a loop exists in the dependency path including the target node.

The loop detection message can include a globally unique private identifier of the target node.

In this example, if the target node is in the loop, the loop detection message sent by the target node is definitely and finally transferred back to the target node. Therefore, after receiving the loop detection message sent by the target node, the target node can re-determine that a loop exists in the dependency path including the target node, to achieve second-time loop confirmation, thereby reducing the loop detection error detection rate, and improving the loop detection correctness.

In some embodiments, private identifier information of nodes in the loop can be collected based on the loop detection message. The private identifier is a globally unique node identifier indicating a priority of a node, so that after receiving the detection message, the target node can disable a node with the highest or lowest priority in the loop, to remove the loop.

In some embodiments, the loop detection message includes the private identifier of the target node. When receiving the loop detection message, the downstream node of the target node can determine whether the public identifier included in the downstream node of the target node is the same as the private identifier included in the loop detection message. If the downstream node of the target node determines that the public identifier of the target node is the same as the private identifier of the target node, the downstream node of the target node can determine that the downstream node of the target node is in the loop, and after adding the private identifier of the downstream node of the target node to the loop detection message, continue to send the loop detection message downstream, and so on, to transfer the private identifier of each node in the dependency path downstream. Therefore, the loop detection message can collect the private identifier of the node in the loop.

In a loop detection message transfer process, after receiving the loop detection message, the target node can obtain a private identifier that is of each node and that is carried in the loop detection message; determine, as a loop processing node, a node with the highest or lowest priority indicated by the private identifier of each node; and trigger the loop processing node to be disabled to remove the loop. In this way, the node with the highest or lowest priority in the loop can be killed to remove the loop.

The following describes the embodiments with reference to a specific scenario.

FIG. 5 is a schematic diagram illustrating a dependency path, according to this application. The dependency path can be a path generated in a distributed database system. A node included in the system can be configured to execute a transaction process of a database transaction. A data dependency path between nodes includes a path in a WFG wait-for graph constructed based on a lock waiting relationship between transaction processes in the distributed database system. A depth of the node can be a lock waiting depth. In this example, loop detection is deadlock detection.

The dependency path shown in FIG. 5 includes five nodes A, B, C, D, and E. Dependency paths whose start points are the node A include A→B→D→C→A and A→B→D→E. In an initial stage, a private identifier can be allocated to each node based on a deadlock priority of the node. A value of a private identifier of a node with the higher priority is larger. A public identifier of each node is equal to a private identifier of the node. Each node can further maintain a candidate state and a notification state. After the candidate state becomes stable, it can indicate whether a loop exists in a dependency path corresponding to the node. The candidate state can include a TRUE (T) state indicating that a loop exists in the dependency path corresponding to the node, and a FALSE (F) state indicating that a loop does not exist in the dependency path corresponding to the node. The notification state is used to indicate whether to notify the downstream node to update the candidate state. The notification state includes a TRUE (T) state indicating to notify the downstream node of the node to update the candidate state and a FALSE (F) state indicating not to notify the downstream node of the node to update the candidate state.

Each node further maintains a dependency relationship between the node and an adjacent downstream node of the node. An increasing function further maintained by each node is INC(V)=V+1. Here, V is an input, and INC (V) is an output. Each node further maintains a proposition M used to update a candidate state of the node. If a candidate state of at least one downstream node of the node is T, the candidate state of the node is updated to T; or if candidate states of all downstream nodes on which the node depends are all F, a subsequent state of the node is updated to F.

The nodes shown in FIG. 5 can perform candidate state maintenance and transfer.

FIG. 6a, FIG. 6b, FIG. 6c, and FIG. 6d each are a schematic diagram illustrating maintenance and transfer of a candidate state of a node, according to this application. An upper half area of each node in the figure indicates a candidate state, and a lower half area indicates a notification state.

As shown in FIG. 6a, when a dependency relationship is established between any two nodes, a candidate state and a notification state of an upstream node can be updated to T, indicating that the candidate state is the first candidate state, and the notification state is updated to the first notification state.

When a dependency relationship is established between the node D in FIG. 5 and the node E, a candidate state and a notification state of the node D are updated to T.

As shown in FIG. 6b, when a dependency relationship between any two nodes is removed, if an upstream node has no downstream node (that is, an out-degree is 0), a candidate state and a notification state of the upstream node are updated to F, indicating that the candidate state is the second candidate state, and the notification state is updated to the second notification state. If an upstream node has a downstream node (that is, an out-degree is greater than 0), a candidate state and a notification state of the upstream node do not have to be adjusted.

For example, it is assumed that the node E further depends on the node F. If the node E and the node F remove a dependency relationship, because the node E does not have another downstream node, a candidate state and a notification state can be updated to F.

Any target node in the system can periodically send a candidate state obtaining request to an adjacent downstream node of the target node, and the adjacent downstream node can send a candidate state of the adjacent downstream node to the target node. The target node can update the candidate state of the downstream node or the candidate state of the target node based on a notification state of the target node.

Figure 6C:
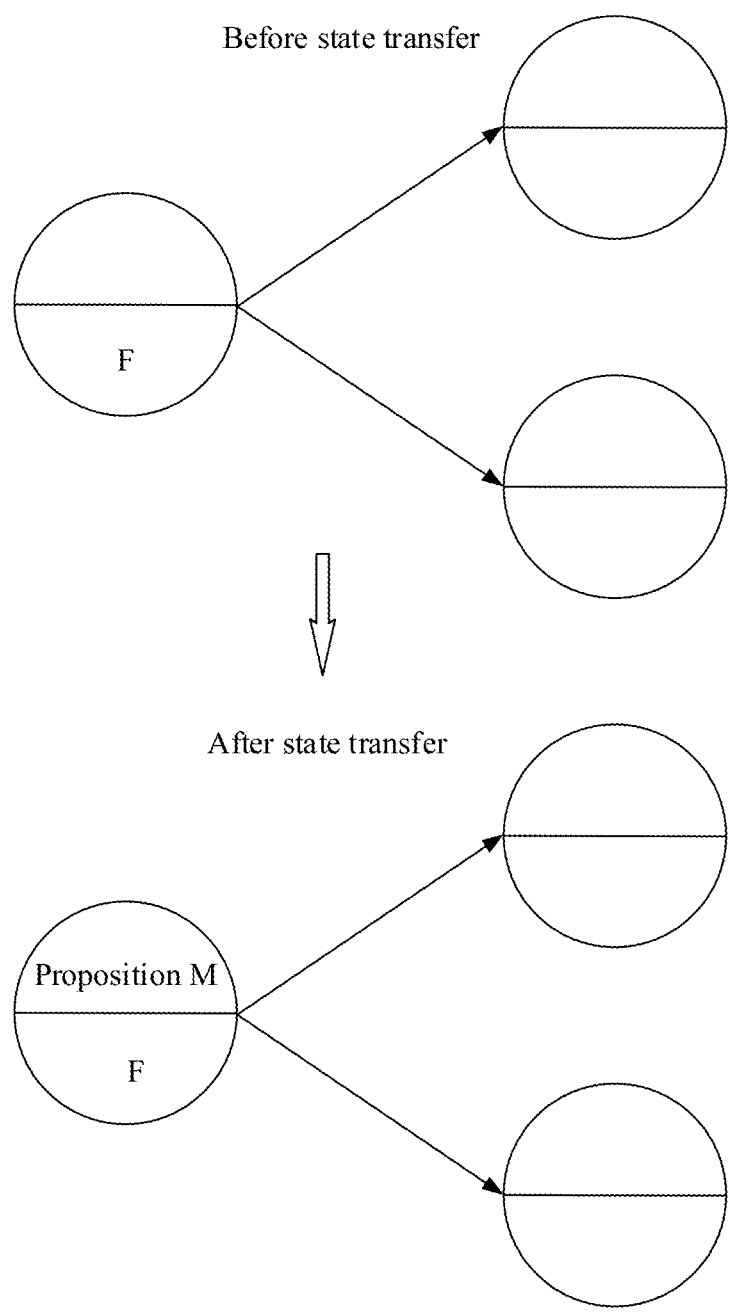
FIG. 6c is a schematic diagram illustrating maintenance and transfer of a candidate state of a node, according to this application.

As shown in FIG. 6c, after any target node in the system receives a candidate state of a downstream node of the target node, if a notification state of the target node is F, the downstream node of the target node is not notified to update the candidate state, and the candidate state of the target node can be updated based on the proposition M, to complete candidate state transfer.

For example, for the node D in FIG. 5, it is assumed that the notification state of the node D is F, the candidate state of the node C is T, and the candidate state of the node E is F. After obtaining the candidate state of the adjacent downstream node C and the candidate state of the adjacent downstream node E, the node D does not update the candidate state of the node C and the candidate state of the node E, and the node D sets the candidate state of the node C to the candidate state of the node D based on the proposition M, to complete candidate state transfer.

Figure 6D:
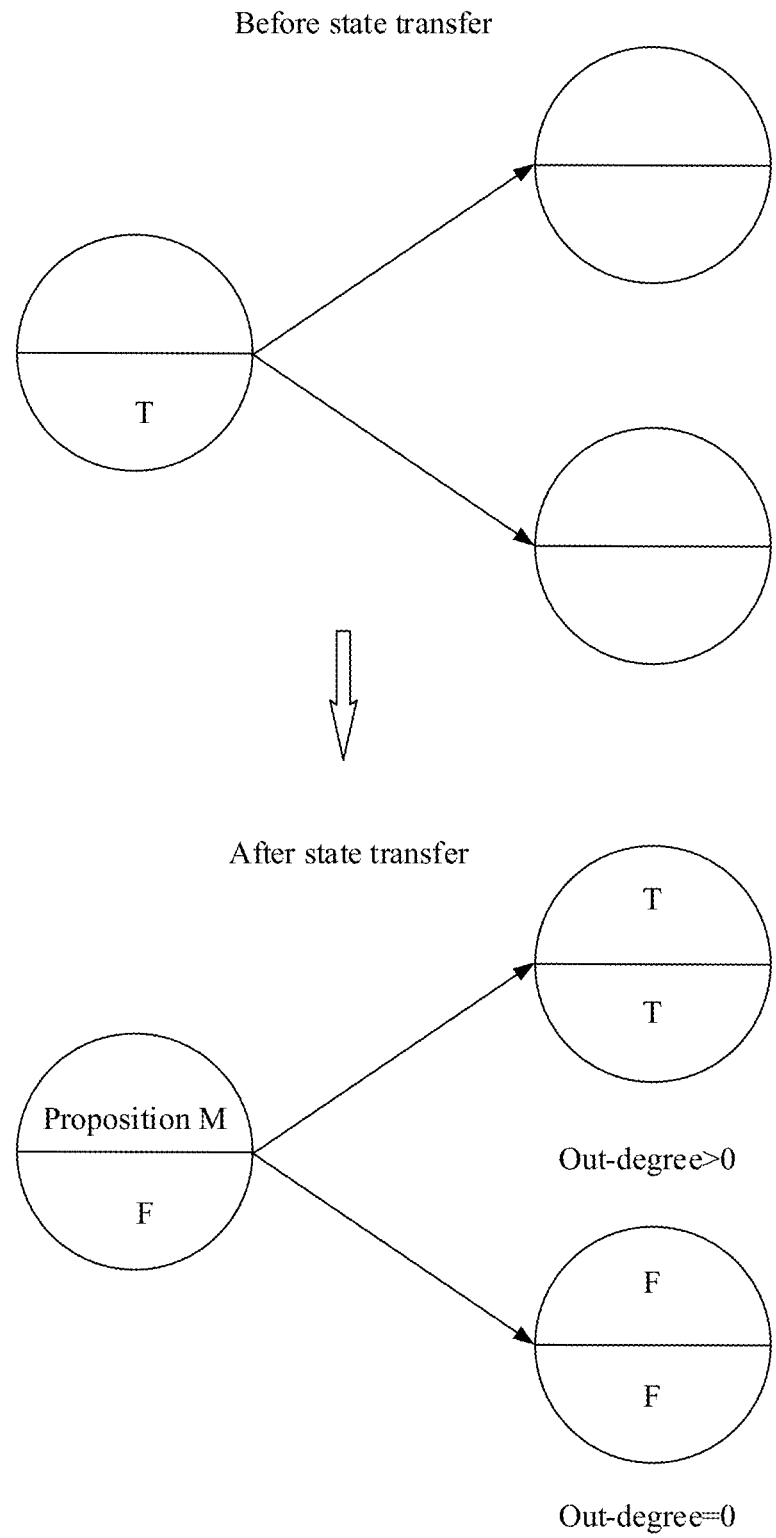
FIG. 6d is a schematic diagram illustrating maintenance and transfer of a candidate state of a node, according to this application.

As shown in FIG. 6d, after any target node in the system receives a candidate state of a downstream node of the target node, if a notification state of the target node is T, the downstream node of the target node is notified to update the candidate state. If the downstream node is an end node (the downstream node has no downstream node, that is, an out-degree is 0), the candidate state and a notification state of the downstream node are updated to F. If the downstream node is not an end node (that is, the downstream node has a downstream node, that is, an out-degree is greater than 0), the candidate state and the notification state of the downstream node are updated to T. The target node can update the candidate state of the target node based on the proposition M, and set the notification state of the target node to F after the candidate state is updated, so that the candidate state of the downstream node of the target node can tend to be stable.

For example, for the node D in FIG. 5, assuming that the notification state of the node D is T, the adjacent downstream node C and the adjacent downstream node E of the node D can be notified to update the candidate state. Therefore, the downstream node can obtain an accurate candidate state. Then, the node D can update the candidate state of the node D based on an updated candidate state of the node C and an updated candidate state of the node E, and set the notification state to F, so that the candidate state of the node C and the candidate state of the node E can be maintained stable.

Candidate state maintenance and transfer steps shown in FIG. 6a, FIG. 6b, FIG. 6c, and FIG. 6d are periodically performed, so that a candidate state of each node in a dependency path can be consistent with a candidate state of an endpoint. To be specific, if the endpoint is a node in a loop, the candidate state of the endpoint is the first candidate state, and candidate states of all nodes are the first candidate state after transfer, indicating that a loop exists in the dependency path. If the endpoint is an end node, the candidate state of the endpoint is the second candidate state, and candidate states of all nodes are also the second candidate state after transfer, indicating that no loop exists in the dependency path, which accords with an actual situation.

In a candidate state maintenance and transfer process, each node shown in FIG. 5 can further perform public identity maintenance and transfer.

FIG. 7a, FIG. 7b, FIG. 7c, and FIG. 7d each are a schematic diagram illustrating maintenance and transfer of a public identifier of a node, according to this application.

An upper left area of each of the node A and the node B in the figure indicates a public identifier, a lower left area indicates a private identifier, an upper right area indicates a candidate state, and a lower right area indicates an identifier source.

Figure 7A:
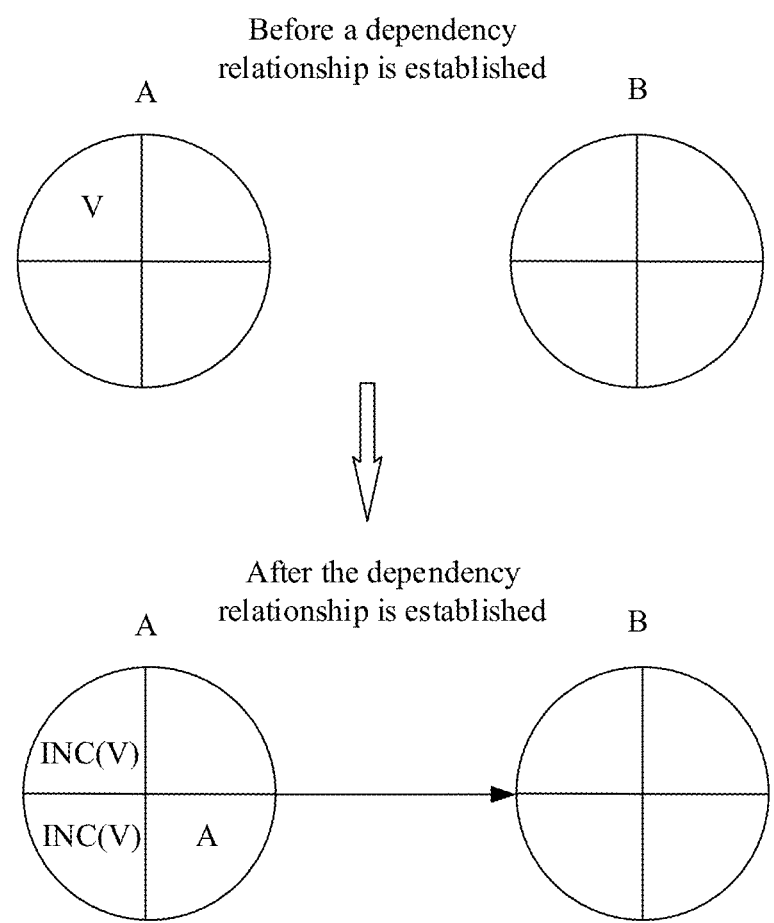
FIG. 7a is a schematic diagram illustrating maintenance and transfer of a public identifier of a node, according to this application.

As shown in FIG. 7a, when a dependency relationship is established between any two nodes, a current public identifier V of an upstream node can be input into the increasing function, to obtain an increased public identifier INC(V). Then, a private identifier can be set to INC(V), and an information source is identified as a sequence number of a downstream node.

Figure 7B:
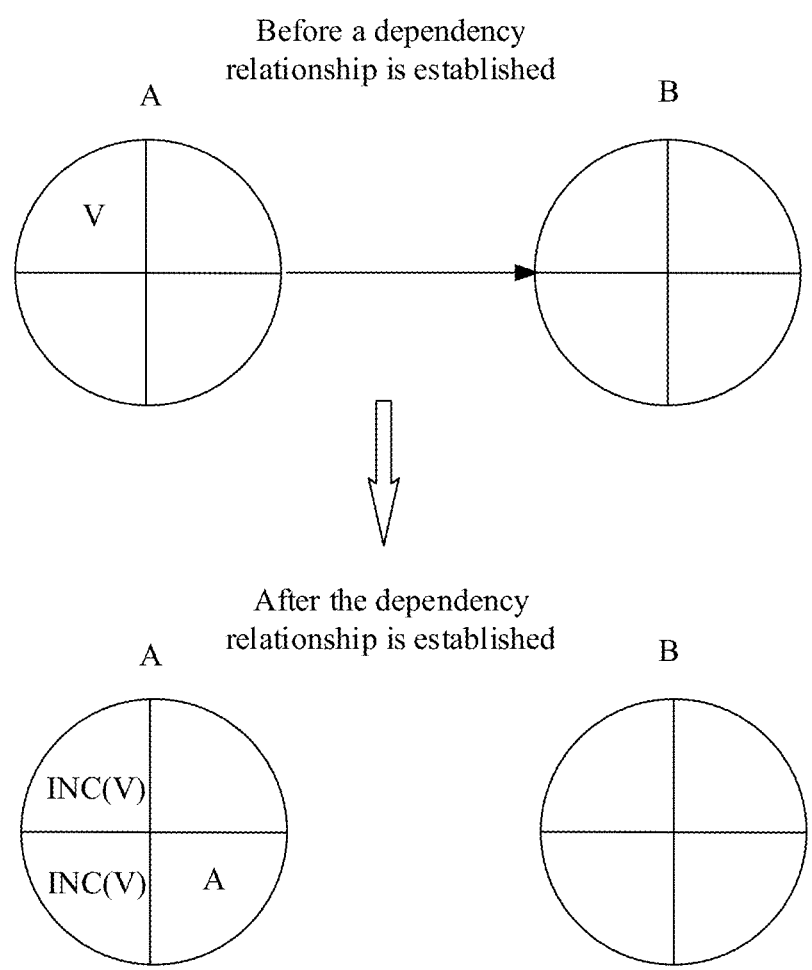
FIG. 7b is a schematic diagram illustrating maintenance and transfer of a public identifier of a node, according to this application.

As shown in FIG. 7b, when a dependency relationship between any two nodes is removed, a current public identifier of an upstream node can be input into the increasing function, to obtain an increased public identifier INC(V). Then, a private identifier can be set to INC(V), and an information source is identified as a sequence number of a downstream node.

Any target node in the system can periodically send a candidate state and public identifier obtaining request to an adjacent downstream node of the target node, and the adjacent downstream node can send a candidate state and a public identifier of the adjacent downstream node to the target node. The target node can update a public identifier of the target node based on the candidate state of the downstream node.

As shown in FIG. 7c, when the downstream node is in the second candidate state, the public identifier of the target node is the same as the public identifier of the downstream node, and when a source identifier of the target node is a sequence number of the downstream node, the target node can set the public identifier and a private identifier of the target node to INC(V), and identify an information source as a sequence number of a downstream node. In this way, a public identifier that is of an out-of-loop node and that has been transferred to the loop can be prevented from being overwritten, thereby avoiding affecting loop detection by the public identifier of the out-of-loop node.

Figure 7D:
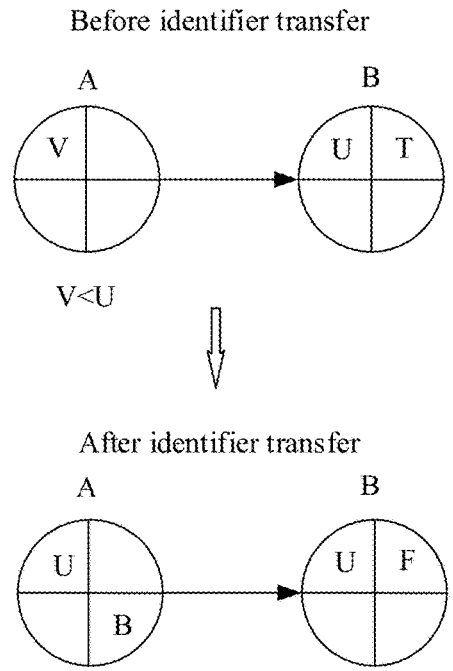
FIG. 7d is a schematic diagram illustrating maintenance and transfer of a public identifier of a node, according to this application.

As shown in FIG. 7d, when the downstream node is in the first candidate state and the public identifier V of the target node is less than the public identifier U of the downstream node, the target node can set the public identifier of the target node to U, and set an identifier source to an identifier of the downstream node. Therefore, public identifier transfer can be completed.

In a public identifier transfer process, if any target node in the system finds that a received public identifier is the same as a private identifier of the target node, it can indicate that a public identifier of the target node is transferred for one round. In other words, a deadlock is found.

Figure 8:
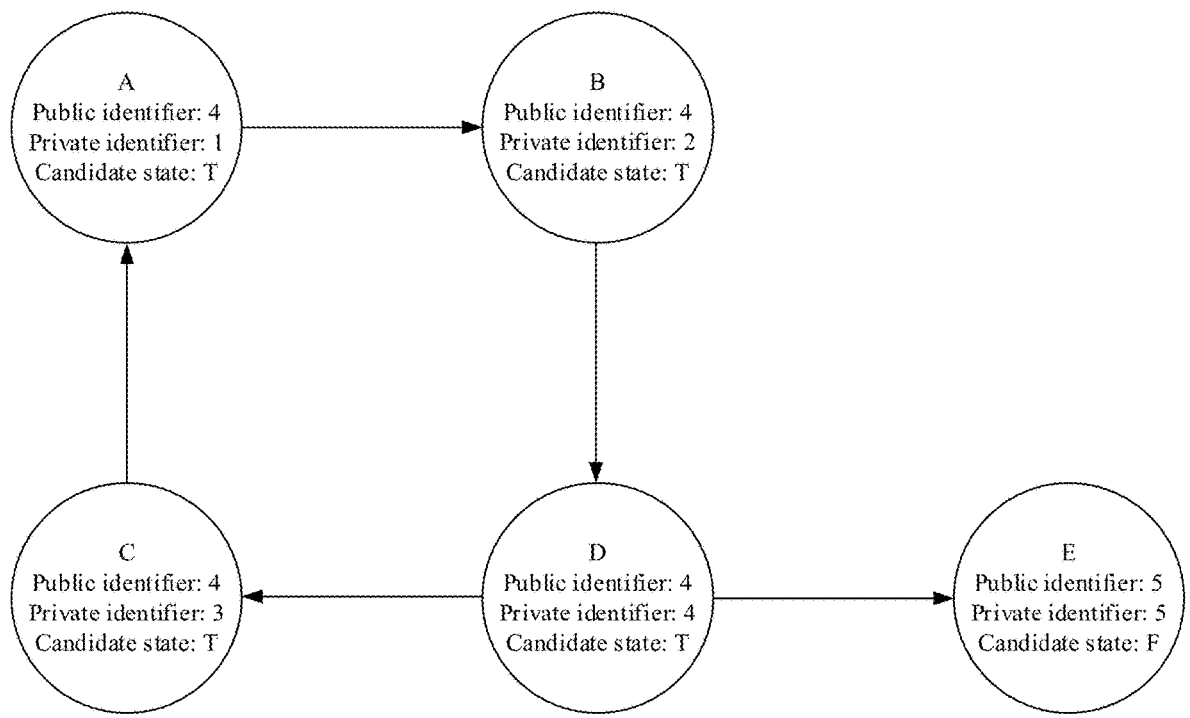
FIG. 8 is a schematic diagram illustrating a node state, according to this application.

FIG. 8 is a schematic diagram illustrating a candidate state and a public identifier of a node, according to this application.

As shown in FIG. 8, after candidate state and public identifier maintenance and updating steps shown in FIG. 6a, FIG. 6b, FIG. 6c, FIG. 6d, FIG. 7a, FIG. 7b, FIG. 7c, and FIG. 7d are performed, a public identifier, a private identifier, and a candidate state maintained by each node in FIG. 5 are shown in Table 1.

TABLE 1

| Sequence number of a node | Public identifier | Private identifier | Candidate state |
|---|---|---|---|
| A | 4 | 1 | T |
| B | 4 | 2 | T |
| C | 4 | 3 | T |
| D | 4 | 4 | T |
| E | 5 | 5 | F |

Candidate states of the in-loop nodes A, B, C, and D are T, and a candidate state of the downstream out-of-loop node E is F. After receiving the public identifier transferred by the upstream node B of the node D, the node D identifies the private identifier of the node D and the public identifier transferred by the node B, that is, can determine that the public identifier 4 of the node D is transferred for one round, that is, find a deadlock.

In this example, each node only needs to maintain a dependency relationship between the node and a node directly adjacent to the node, and only a candidate state and public identifier information need to be transferred between nodes, to prevent the node from maintaining a global dependency path, thereby reducing workload of the node and improving performance of executing a transaction by the node.

After the deadlock is found, a deadlock recheck step can be performed.

The node D that finds the deadlock can initiate a loop detection message. The message includes the private identifier 4 of the node D. The processing node can send the message to the downstream node C. After receiving the message, the downstream node C can verify whether a public identifier maintained by the downstream node C is the private identifier that is of the node D and that is carried in the message. After the public identifier is transferred, the public identifier of the in-loop node C is definitely 4. Therefore, the node C can determine that the node C is an in-loop node, and add the private identifier 3 of the node C to the message, to send the message to the downstream node of the node C. By analogy, when the processing node receives the loop detection message, and finds that the loop detection message includes a private identifier of the processing node, the processing node can determine that a loop actually exists, and determine that a deadlock definitely exists. In this way, the deadlock can be rechecked, to avoid false detection.

Then, the node D can determine a node with the smallest private identifier, that is, the lowest priority from the loop detection message, and perform an operation such as performing transaction rollback on the node, and canceling a dependency relationship of the node, to unlock a deadlock. Therefore, the node with the lowest priority can be disabled, and the deadlock is enabled, to avoid blocking a storage transaction.

Corresponding to the above-mentioned embodiment, this application further provides a loop detection apparatus. The apparatus can be applied to any target node in a distributed system. The target node corresponds to at least one dependency path whose start point is the target node, there is a data dependency relationship between any two adjacent nodes in the dependency path, the target node maintains a candidate state, a public identifier, and a private identifier that correspond to the target node, the public identifier is used to be transferred between adjacent nodes, and the private identifier is used to indicate a node corresponding to the private identifier.

Figure 9:
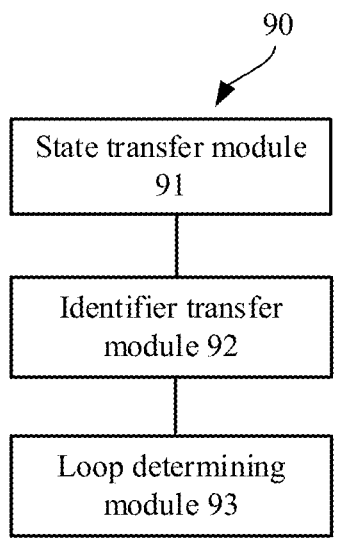
FIG. 9 is a schematic diagram illustrating a structure of a loop detection apparatus, according to this application.

FIG. 9 is a schematic diagram illustrating a structure of a loop detection apparatus, according to this application.

As shown in FIG. 9, the apparatus 90 can include: a state transfer module 91, configured to: obtain a candidate state of an adjacent downstream node, and update the candidate state of the target node based on the candidate state of the adjacent downstream node, so that an upstream node of the target node updates a candidate state of the upstream node based on an updated candidate state of the target node, a candidate state of an endpoint in each dependency path is transferred forwarded, and if the endpoint has a downstream node, the candidate state of the endpoint is a first candidate state; an identifier transfer module 92, configured to: obtain the candidate state and a public identifier of the adjacent downstream node, and update the public identifier of the target node to the public identifier of the adjacent downstream node in response to that the candidate state of the adjacent downstream node is the first candidate state and the public identifier of the target node is less than the public identifier of the adjacent downstream node; and a loop determining module 93, configured to: in response to that the candidate state of the adjacent downstream node is the first candidate state and the private identifier of the target node is equal to the public identifier of the adjacent downstream node, determining that a loop exists in the dependency path corresponding to the target node.

In some shown embodiments, the target node further maintains a notification state, and the notification state includes a first notification state indicating to notify the downstream node of the node to update the candidate state and a second notification state indicating not to notify the downstream node of the node to update the candidate state; and the state transfer module 91 is configured to: update the candidate state of the target node based on the candidate state of the adjacent downstream node in response to that the notification state of the target node is the second notification state; and send a notification message to the adjacent downstream node in response to that the notification state of the target node is the first notification state, so that the adjacent downstream node updates the candidate state to a second candidate state in response to that the adjacent downstream node is an end node, or updates the candidate state to the first candidate state in response to that the adjacent downstream node is not an end node; and update the candidate state of the target node based on the candidate state of the adjacent downstream node, and updating the notification state of the target node to the second notification state.

In some shown embodiments, the apparatus 90 further includes a first updating module, configured to: in response to that a dependency relationship is established, update the notification state of the target node to the first notification state, and updating the candidate state of the target node to the first candidate state; and in response to that the dependency relationship is removed and the target node is the end node, update the candidate state of the target node to the second candidate state, and updating the notification state of the target node to the second notification state.

In some shown embodiments, the target node further maintains identifier source information, and the identifier source information indicates a source of the public identifier of the target node; and the apparatus 90 further includes: a second updating module, configured to update the identifier source information of the target node after the public identifier of the target node is updated to the public identifier of the adjacent downstream node, so that the identifier source information indicates that the public identifier of the target node comes from the adjacent downstream node.

In some shown embodiments, after the candidate state and a public identifier of the adjacent downstream node are obtained, the apparatus 90 further includes: a first increasing module, configured to: in response to that the candidate state of the adjacent downstream node is a second candidate state and the identifier source information of the target node indicates that the public identifier of the target node comes from the adjacent downstream node, increase the public identifier of the target node, and update the private identifier of the target node to the increased public identifier, so that the public identifier and the private identifier of the target node are greater than the public identifier of the adjacent downstream node.

In some shown embodiments, the first increasing module is configured to input the public identifier of the target node into an increasing function, to obtain the increased public identifier. The increasing function is used to make an output greater than an input.

In some shown embodiments, the apparatus 90 further includes a second increasing module, configured to: in response to that a dependency relationship is established or removed, increase the public identifier of the target node, and update the private identifier of the target node to the increased public identifier.

In some shown embodiments, the apparatus 90 further includes a loop detection message sending module, configured to: further send, by the target node, a loop detection message to the downstream node of the target node when determining that a loop exists in the dependency path corresponding to the target node; and in response to receiving the loop detection message sent by the upstream node of the target node, determine that a loop exists in the dependency path including the target node.

In some shown embodiments, the private identifier is a globally unique node identifier indicating a priority of the node; the loop detection message includes the private identifier of the target node, and when receiving the loop detection message, after determining that the public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the dependency path downstream; and the apparatus 90 further includes: a loop processing node determining module, configured to: in response to receiving the loop detection message sent by the upstream node of the target node, obtain the private identifier that is of each node and that is carried in the loop detection message, and determine that a node that has the highest or lowest priority and that is indicated by the private identifier of each node is a loop processing node; and a first disabling module, configured to trigger the loop processing node to be disabled, to remove the loop.

In some shown embodiments, the apparatus 90 further includes a second disabling module, configured to: in response to determining that a loop exists in the dependency path including the target node, triggering the target node to be disabled, to remove the loop.

In some shown embodiments, the distributed system includes a distributed database system, the node includes a transaction process configured to execute a database transaction, and the dependency path includes a path in a WPG wait-for graph constructed based on a lock waiting relationship between transaction processes in the distributed database system.

The embodiment of the loop detection apparatus shown in this application can be applied to an electronic device. Correspondingly, this application discloses an electronic device. The device can include: a processor; and a memory, configured to store processor-executable instructions.

The processor is configured to invoke the executable instructions stored in the memory, to implement the loop detection method shown in any one of the above-mentioned embodiments.

Figure 10:
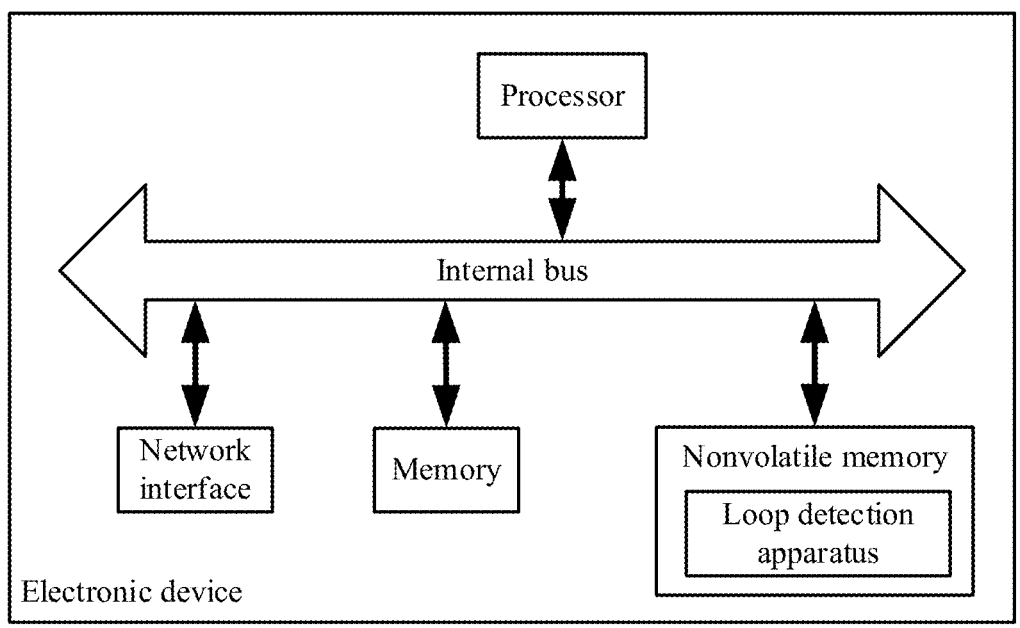
FIG. 10 is a schematic diagram illustrating a hardware structure of an electronic device, according to this application.

FIG. 10 is a schematic diagram illustrating a hardware structure of an electronic device, according to this application.

As shown in FIG. 10, the electronic device can include: a processor, configured to execute instructions; a network interface, configured to perform a network connection; a memory, configured to store running data for the processor; and a nonvolatile memory, configured to store instructions corresponding to a loop detection apparatus.

The embodiment of the apparatus can be implemented by using software, or can be implemented by using hardware or a combination of software and hardware. Software implementation is used as an example. As a logical apparatus, the apparatus is formed by reading corresponding computer program instructions in a nonvolatile memory to a memory by a processor of an electronic device in which the apparatus is located. In terms of hardware, in addition to the processor, the memory, the network interface, and the nonvolatile memory shown in FIG. 10, the electronic device in which the apparatus in the embodiment is located can usually include other hardware based on an actual function of the electronic device. Details are omitted here.

It can be understood that, instructions corresponding to the loop detection apparatus can also be directly stored in the memory, to improve a processing speed. This is not limited here.

This application provides a computer-readable storage medium. The storage medium stores a computer program, and the computer program is used to enable a processor to perform the loop detection method shown in any one of the above-mentioned embodiments.

A person skilled in the art should understand that one or more embodiments of this application can be provided as a method, a system, or a computer program product. Therefore, one or more embodiments of this application can be in a form of hardware only embodiments, software only embodiments, or embodiments with a combination of software and hardware. In addition, one or more embodiments of this application can be in a form of a computer program product that is implemented on one or more computer-usable storage media (which can include but be not limited to a disk memory, a CD-ROM, an optical memory, etc.) that include computer-usable program code.

"And/or" recorded in this application indicates that there is at least one of the two. For example, "A and/or B" includes three solutions: A, B, and "A and B".

The embodiments of this application are described in a progressive way. For same or similar parts of the embodiments, mutual references can be made to the embodiments. Each embodiment focuses on a difference from other embodiments. Particularly, the data processing device embodiments are basically similar to the method embodiments, and therefore are described briefly. For related parts, references can be made to some descriptions in the method embodiments.

Specific embodiments of this application are described above. Other embodiments fall within the scope of the appended claims. In some cases, the behaviors or steps described in the claims can be performed in a sequence different from that in some embodiments and desired results can still be achieved. In addition, the process depicted in the accompanying drawings does not necessarily need a particular sequence or consecutive sequence to achieve the desired results. In some implementations, multi-tasking and parallel processing are feasible or may be advantageous.

Embodiments of a subject and a function operation described in this application can be implemented below: a digital electronic circuit, computer software or firmware that is materially embodied, computer hardware that includes a structure disclosed in this application and a structural equivalent thereof, or one or a combination thereof. Embodiments of the subject described in this application can be implemented as one or more computer programs, that is, one or more modules of computer program instructions encoded on a tangible non-temporary program carrier that are executed by a data processing apparatus or that are used to control operation of the data processing apparatus. Alternatively or additionally, program instructions can be encoded on an artificially generated propagation signal, for example, an electrical, optical, or electromagnetic signal generated by a machine. The signal is generated, to encode and transmit information to a proper receiver apparatus to be executed by a data processing apparatus. The computer storage medium can be a machine-readable storage device, a machine-readable storage substrate, a random or serial access memory device, or a combination of one or more thereof.

Processing and logic procedures described in this application can be executed by one or more programmable computers that execute one or more computer programs, to perform an operation based on input data, and generate an output to perform a corresponding function. The processing and logic procedures can alternatively be performed by a dedicated logic circuit, for example, a field programmable gate array (FPGA) or an application-specific integrated circuit (ASIC), and the apparatus can also be implemented as a dedicated logic circuit.

A computer suitable to execute the computer program includes, for example, a general and/or dedicated microprocessor, or any other type of central processing system. Usually, the central processing system receives instructions and data from a read-only memory and/or a random access memory. Basic components of the computer include a central processing system for implementing or executing instructions and one or more memory devices for storing instructions and data. Usually, the computer further includes one or more large-capacity storage devices for storing data such as a magnetic disk, a magneto-optical disk, or an optical disk, or the computer is operably coupled to the large-capacity storage device, to receive data from or transfer data to the large-capacity storage device, or both of which exist. However, the computer does not have to include such a device. In addition, the computer can be embedded in another device, for example, a mobile phone, a personal digital assistant (PDA), a mobile audio or video player, a game console, a global positioning system (GPS) receiver, or a portable storage device such as a universal serial bus (USB) flash drive. Only several examples are provided.

A computer-readable medium suitable to store computer program instructions and data includes all forms of non-volatile memories, media, and memory devices such as a semiconductor memory device (for example, an EPROM, an EEPROM, and a flash memory device), a magnetic disk (for example, an internal hard disk or a removable disk), a magneto-optical disk, 0xCD_00 ROM, and a DVD-ROM disk. The processor and the memory can be supplemented by the dedicated logic circuit or incorporated into the dedicated logic circuit.

Although this application includes many specific implementation details, these should not be construed as limiting any disclosed scope or claimed scope, but are mainly used to describe the features of specific disclosed embodiments. Some features described in a plurality of embodiments in this application can also be implemented in combination in a single embodiment. In addition, various features described in a single embodiment can also be implemented separately in a plurality of embodiments or in any suitable sub-combination. In addition, although features can function in some combinations as described above and even initially claim protection, one or more features in the claimed combination can be removed from the combination in some cases, and the claimed combination can point to a sub-combination or a variant of a sub-combination.

Similarly, although operations are depicted in a particular order in the accompanying drawings, this should not be understood as requiring these operations to be executed in the shown particular order or sequential order, or requiring all illustrated operations to be executed to achieve the desired results. In some cases, multi-task and parallel processing may be advantageous. In addition, separation of various system modules and components in the embodiments should not be understood as requiring such separation in all embodiments, and it should be understood that the described program components and systems can be usually integrated into a single software product or packaged into a plurality of software products.

Therefore, specific embodiments of the subject are described. Other embodiments fall within the scope of the appended claims. In some cases, actions described in the claims can be performed in a different sequence and desired results are still achieved. In addition, processing depicted in the accompanying drawings is not necessarily in a shown particular order or sequential order to achieve the desired results. In some implementations, multi-task and parallel processing may be advantageous.

The above-mentioned descriptions are merely preferred embodiments in one or more embodiments of this application, but are not intended to limit the one or more embodiments of this application. Any modification, equivalent replacement, improvement, and the like made without departing from the spirit and principle of the one or more embodiments of this application shall fall within the protection scope of the one or more embodiments of this application.

What is claimed is:

1. A loop detection method, applied to any target node in a distributed system, wherein the target node corresponds to at least one dependency path whose start point is the target node, there is a data dependency relationship between any two adjacent nodes in the dependency path, the target node maintains a candidate state, a public identifier, and a private identifier that correspond to the target node, the public identifier is used to be transferred between adjacent nodes, and the private identifier is used to indicate a node corresponding to the private identifier; and the method comprises:
obtaining a candidate state of an adjacent downstream node, and updating the candidate state of the target node based on the candidate state of the adjacent downstream node, so that an upstream node of the target node updates a candidate state of the upstream node based on an updated candidate state of the target node, a candidate state of an endpoint in each dependency path is transferred forwarded, and upon determining that the endpoint has a downstream node, the candidate state of the endpoint is a first candidate state;

obtaining the candidate state and a public identifier of the adjacent downstream node, and updating the public identifier of the target node to the public identifier of the adjacent downstream node in response to that the candidate state of the adjacent downstream node is the first candidate state and the public identifier of the target node is less than the public identifier of the adjacent downstream node; and in response to that the candidate state of the adjacent downstream node is the first candidate state and the private identifier of the target node is equal to the public identifier of the adjacent downstream node, determining that a loop exists in the dependency path corresponding to the target node.

2. The method according to claim 1, wherein the target node further maintains a notification state, and the notification state comprises a first notification state indicating to notify the downstream node of the node to update the candidate state and a second notification state indicating not to notify the downstream node of the node to update the candidate state; and the updating the candidate state of the target node based on the candidate state of the adjacent downstream node comprises:

updating the candidate state of the target node based on the candidate state of the adjacent downstream node in response to that the notification state of the target node is the second notification state; and sending a notification message to the adjacent downstream node in response to that the notification state of the target node is the first notification state, so that the adjacent downstream node updates the candidate state to a second candidate state in response to that the adjacent downstream node is an end node, or updates the candidate state to the first candidate state in response to that the adjacent downstream node is not an end node; and updating the candidate state of the target node based on the candidate state of the adjacent downstream node, and updating the notification state of the target node to the second notification state.

3. The method according to claim 2, wherein the method further comprises:

in response to that a dependency relationship is established, updating the notification state of the target node to the first notification state, and updating the candidate state of the target node to the first candidate state; and in response to that the dependency relationship is removed and the target node is the end node, updating the candidate state of the target node to the second candidate state, and updating the notification state of the target node to the second notification state.

4. The method according to claim 1, wherein the target node further maintains identifier source information, and the identifier source information indicates a source of the public identifier of the target node; and the method further comprises:

updating the identifier source information of the target node after the public identifier of the target node is updated to the public identifier of the adjacent downstream node, so that the identifier source information indicates that the public identifier of the target node comes from the adjacent downstream node.

5. The method according to claim 4, wherein after the obtaining the candidate state and a public identifier of the adjacent downstream node, the method further comprises:

in response to that the candidate state of the adjacent downstream node is a second candidate state and the identifier source information of the target node indicates that the public identifier of the target node comes from the adjacent downstream node, increasing the public identifier of the target node, and updating the private identifier of the target node to the increased public identifier, so that the public identifier and the private identifier of the target node are greater than the public identifier of the adjacent downstream node.

6. The method according to claim 5, wherein the increasing the public identifier of the target node comprises:

inputting the public identifier of the target node into an increasing function, to obtain the increased public identifier, wherein the increasing function is used to make an output greater than an input.

7. The method according to claim 5, further comprising:

in response to that a dependency relationship is established or removed, increasing the public identifier of the target node, and updating the private identifier of the target node to the increased public identifier.

8. The method according to claim 7, further comprising:

further sending, by the target node, a loop detection message to the downstream node of the target node when determining that a loop exists in the dependency path corresponding to the target node; and in response to receiving the loop detection message sent by the upstream node of the target node, determining that a loop exists in the dependency path comprising the target node.

9. The method according to claim 8, wherein the private identifier is a globally unique node identifier indicating a priority of the node;

the loop detection message comprises the private identifier of the target node, and when receiving the loop detection message, after determining that the public identifier of the downstream node of the target node is the same as the private identifier of the target node, the downstream node of the target node adds a private identifier of the downstream node to the loop detection message, and then continues to send the loop detection message downstream, and so on, to transfer a private identifier of each node in the dependency path downstream; and the method further comprises:

in response to receiving the loop detection message sent by the upstream node of the target node, obtaining the private identifier that is of each node and that is carried in the loop detection message, and determining that a node that has the highest or lowest priority and that is indicated by the private identifier of each node is a loop processing node; and triggering the loop processing node to be disabled, to remove the loop.

10. The method according to claim 1, wherein the method further comprises:

in response to determining that a loop exists in the dependency path comprising the target node, triggering the target node to be disabled, to remove the loop.

11. The method according to claim 1, wherein the distributed system comprises a distributed database system, the node comprises a transaction process configured to execute a database transaction, and the dependency path comprises a path in a WPG wait-for graph constructed based on a lock waiting relationship between transaction processes in the distributed database system.

12. A distributed system comprising one or more target nodes, each of the one or more target nodes comprising a processor and a memory wherein the memory stores executable instructions that, in response to execution by the processor, cause the processor to implement a loop detection method, the method applied to any target node in the distributed system, wherein the target node corresponds to at least one dependency path whose start point is the target node, there is a data dependency relationship between any two adjacent nodes in the dependency path, the target node maintains a candidate state, a public identifier, and a private identifier that correspond to the target node, the public identifier is used to be transferred between adjacent nodes, and the private identifier is used to indicate a node corresponding to the private identifier; and the method comprises:

obtaining a candidate state of an adjacent downstream node, and updating the candidate state of the target node based on the candidate state of the adjacent downstream node, so that an upstream node of the target node updates a candidate state of the upstream node based on an updated candidate state of the target node, a candidate state of an endpoint in each dependency path is transferred forwarded, and upon determining that the endpoint has a downstream node, the candidate state of the endpoint is a first candidate state;

obtaining the candidate state and a public identifier of the adjacent downstream node, and updating the public identifier of the target node to the public identifier of the adjacent downstream node in response to that the candidate state of the adjacent downstream node is the first candidate state and the public identifier of the target node is less than the public identifier of the adjacent downstream node; and in response to that the candidate state of the adjacent downstream node is the first candidate state and the private identifier of the target node is equal to the public identifier of the adjacent downstream node, determining that a loop exists in the dependency path corresponding to the target node.

13. A non-transitory computer-readable storage medium having stored therein instructions that, when executed by a processor of a computing device, cause the processor to implement a loop detection method, the method applied to any target node in a distributed system, wherein the target node corresponds to at least one dependency path whose start point is the target node, there is a data dependency relationship between any two adjacent nodes in the dependency path, the target node maintains a candidate state, a public identifier, and a private identifier that correspond to the target node, the public identifier is used to be transferred between adjacent nodes, and the private identifier is used to indicate a node corresponding to the private identifier; and the method comprises:

obtaining a candidate state of an adjacent downstream node, and updating the candidate state of the target node based on the candidate state of the adjacent downstream node, so that an upstream node of the target node updates a candidate state of the upstream node based on an updated candidate state of the target node, a candidate state of an endpoint in each dependency path is transferred forwarded, and upon determining that the endpoint has a downstream node, the candidate state of the endpoint is a first candidate state;

obtaining the candidate state and a public identifier of the adjacent downstream node, and updating the public identifier of the target node to the public identifier of the adjacent downstream node in response to that the candidate state of the adjacent downstream node is the first candidate state and the public identifier of the target node is less than the public identifier of the adjacent downstream node; and in response to that the candidate state of the adjacent downstream node is the first candidate state and the private identifier of the target node is equal to the public identifier of the adjacent downstream node, determining that a loop exists in the dependency path corresponding to the target node.

* * * * *